US008961163B2

(12) United States Patent
Zorovich et al.

(10) Patent No.: US 8,961,163 B2
(45) Date of Patent: Feb. 24, 2015

(54) APPARATUS FOR MAKING FROZEN COMESTIBLES

(71) Applicant: Propeller, Inc., Hoboken, NJ (US)

(72) Inventors: Kenneth D. Zorovich, Hoboken, NJ (US); John C. Earle, Annapolis, MD (US); Yos Kumthampinij, Tenafly, NJ (US); William Nickley, Jersey City, NJ (US)

(73) Assignee: Propeller, Inc., Hoboken, NJ (US)

( * ) Notice: Subject to any disclaimer, the term of this patent is extended or adjusted under 35 U.S.C. 154(b) by 0 days.

(21) Appl. No.: 14/156,646

(22) Filed: Jan. 16, 2014

(65) Prior Publication Data
US 2014/0197300 A1 Jul. 17, 2014

Related U.S. Application Data

(60) Provisional application No. 61/753,333, filed on Jan. 16, 2013.

(51) Int. Cl.
*A23G 9/26* (2006.01)
*A23G 9/08* (2006.01)
(Continued)

(52) U.S. Cl.
CPC . *A23G 9/26* (2013.01); *A23G 9/503* (2013.01); *A23G 7/0031* (2013.01); *A23G 9/083* (2013.01); *A23G 9/50* (2013.01)
USPC ........ 425/121; 425/126.2; 425/318; 425/438; 425/458; 426/91; 426/512; 426/389; 249/119; 249/120; 249/92; 249/127; 249/134

(58) Field of Classification Search
CPC ........... A23G 9/083; A23G 9/26; A23G 9/50; A23G 9/503; A23G 7/0031; A23G 3/125

USPC ............ 249/58, 63, 64, 69–71, 92, 119, 120, 249/122, 124, 125, 127, 134, 177; 425/117, 425/121, 126.1, 126.2, 318, 438, 458; 62/345, 350; 426/91, 101, 512, 389
See application file for complete search history.

(56) References Cited

U.S. PATENT DOCUMENTS 1,505,592 A 8/1924 Epperson
1,688,815 A * 10/1928 Kobash ........................ 62/531
(Continued)

FOREIGN PATENT DOCUMENTS

CN 2207553 Y 9/1995
CN 2742771 Y 11/2005
(Continued)

OTHER PUBLICATIONS

Color screen shot of the website advertising the "Zoku Quick Ice Pop Maker" sold by Williams-Sonoma (see: http://www.williams-sonoma.com/products/zoku-quick-pop-maker/, accessed May 16, 2014).
(Continued)

*Primary Examiner* — Dimple Bodawala
(74) *Attorney, Agent, or Firm* — Greenberg Traurig, LLP

(57) ABSTRACT

An apparatus for making frozen comestibles including a base having a plurality of apertures formed within said first site thereof, and a plurality of molds attached to or formed integrally with the base. Each of the molds includes a receiving surface and an opening aligned with a corresponding one of the apertures of the base. Each of the molds is moveable between a first position, in which a substantial portion of at least one mold is positioned within the interior portion of the base and said receiving surface forms a molding cavity that is adapted to receive a comestible to be frozen, and a second position, in which a substantial portion of the mold extends outwardly from the first side of the base and the receiving surface of the mold is exposed externally.

10 Claims, 11 Drawing Sheets

(51) Int. Cl.
  *A23G 9/50* (2006.01)
  *A23G 7/00* (2006.01)

(56) References Cited

U.S. PATENT DOCUMENTS

| | | | |
|---|---|---|---|
| 1,698,332 A * | 1/1929 | Henning et al. | 62/4 |
| 1,964,476 A * | 6/1934 | Newman | 249/120 |
| 1,987,945 A | 1/1935 | Schnaier | |
| 2,133,521 A * | 10/1938 | Wussow et al. | 62/67 |
| 2,282,544 A | 5/1942 | Rosberg | |
| 2,285,149 A * | 6/1942 | Arcey | 62/73 |
| 2,288,044 A | 6/1942 | Stemme | |
| 2,317,067 A | 4/1943 | Knaust | |
| 2,460,765 A | 2/1949 | Palaith | |
| 2,498,645 A | 2/1950 | Bobby | |
| 2,591,261 A | 4/1952 | Holahan | |
| 2,775,099 A | 12/1956 | Brown | |
| 2,782,608 A | 2/1957 | French et al. | |
| 2,946,207 A | 7/1960 | Hulterstrum | |
| D188,992 S | 10/1960 | Morrison | |
| 2,980,039 A | 4/1961 | Jolly | |
| D192,225 S | 2/1962 | Coleman | |
| 3,020,730 A | 2/1962 | Harris, Sr. | |
| 3,091,194 A | 5/1963 | Dickinson | |
| 3,161,031 A | 12/1964 | Flannery | |
| 3,261,178 A | 7/1966 | Okada | |
| 3,411,463 A | 11/1968 | Moseres | |
| 3,483,712 A * | 12/1969 | Gram | 62/356 |
| 3,533,246 A | 10/1970 | Hawley | |
| 3,535,889 A | 10/1970 | Curti | |
| 3,695,895 A | 10/1972 | Brown | |
| 3,748,778 A | 7/1973 | Ellies et al. | |
| 3,770,460 A | 11/1973 | Vroman | |
| 3,780,536 A | 12/1973 | Fishman et al. | |
| D249,079 S | 8/1978 | Soderman et al. | |
| 4,104,411 A | 8/1978 | Pooler | |
| 4,239,175 A | 12/1980 | Straubinger | |
| 4,330,245 A | 5/1982 | Billett et al. | |
| 4,352,830 A | 10/1982 | Billett et al. | |
| D269,578 S | 7/1983 | Straubinger | |
| 4,392,803 A | 7/1983 | Cross et al. | |
| 4,550,575 A | 11/1985 | DeGaynor | |
| 4,688,398 A | 8/1987 | Baek | |
| 4,696,166 A | 9/1987 | Bukoschek et al. | |
| 4,797,295 A | 1/1989 | Franco et al. | |
| 4,815,287 A | 3/1989 | O'Daniel | |
| D305,193 S | 12/1989 | Sajadieh | |
| 4,942,742 A * | 7/1990 | Burruel | 62/347 |
| 4,986,080 A | 1/1991 | Grigoli et al. | |
| 5,160,689 A * | 11/1992 | Kamen | 264/297.8 |
| 5,177,981 A | 1/1993 | Haas | |
| 5,354,191 A | 10/1994 | Bobis | |
| 5,516,540 A | 5/1996 | Cathenaut | |
| 5,568,729 A | 10/1996 | Heinrich et al. | |
| D390,335 S | 2/1998 | Carrick et al. | |
| 5,720,175 A | 2/1998 | White et al. | |
| 5,884,490 A * | 3/1999 | Whidden | 62/70 |
| 5,939,983 A | 8/1999 | Rudell et al. | |
| 5,946,773 A | 9/1999 | Esker et al. | |
| 6,109,056 A * | 8/2000 | Feldpausch | 62/356 |
| 6,190,226 B1 | 2/2001 | Conconi | |
| RE37,213 E | 6/2001 | Staggs | |
| 6,301,919 B1 * | 10/2001 | Blaustein et al. | 62/345 |
| D454,751 S | 3/2002 | Zank | |
| D457,389 S | 5/2002 | Snell | |
| D457,782 S | 5/2002 | Snell | |
| 6,399,126 B1 | 6/2002 | Weldon, Jr. | |
| 6,425,438 B1 | 7/2002 | Hahn | |
| 6,481,239 B2 | 11/2002 | Hodosh et al. | |
| 6,540,200 B2 | 4/2003 | Afolabi | |
| 6,631,616 B2 | 10/2003 | Wisniewski et al. | |
| 6,745,595 B1 | 6/2004 | Kateman et al. | |
| D506,640 S | 6/2005 | Marck et al. | |
| D540,006 S | 4/2007 | Green et al. | |
| D550,509 S | 9/2007 | Dretzka | |
| D557,073 S | 12/2007 | Snell | |
| 7,520,140 B2 | 4/2009 | DeLucia | |
| D592,911 S * | 5/2009 | Buchanan | D7/605 |
| D594,626 S | 6/2009 | Reed | |
| D613,132 S | 4/2010 | Frank | |
| D613,566 S * | 4/2010 | Chapman et al. | D7/672 |
| D623,898 S | 9/2010 | Snell | |
| D626,307 S | 11/2010 | Zorovich et al. | |
| D626,384 S | 11/2010 | Zorovich et al. | |
| D630,407 S | 1/2011 | Zorovich et al. | |
| D634,988 S | 3/2011 | Zorovich et al. | |
| D637,035 S | 5/2011 | Zorovich et al. | |
| D640,120 S | 6/2011 | Zorovich et al. | |
| 7,955,066 B2 | 6/2011 | Takeuchi | |
| D642,022 S | 7/2011 | Zorovich et al. | |
| D655,147 S | 3/2012 | Zorovich et al. | |
| D658,456 S | 5/2012 | Zorovich et al. | |
| D658,948 S * | 5/2012 | Zorovich et al. | D7/629 |
| D667,706 S * | 9/2012 | Sandford et al. | D7/672 |
| 8,430,658 B2 | 4/2013 | Zorovich et al. | |
| D689,746 S * | 9/2013 | Zorovich et al. | D7/672 |
| D689,747 S * | 9/2013 | Zorovich et al. | D7/672 |
| D690,169 S * | 9/2013 | Zorovich et al. | D7/672 |
| 2003/0126712 A1 | 7/2003 | Kosick | |
| 2004/0076727 A1 | 4/2004 | L'Hommedieu | |
| 2005/0072321 A1 | 4/2005 | Larsen | |
| 2005/0202138 A1 | 9/2005 | Kazich | |
| 2006/0134296 A1 * | 6/2006 | Lin | 426/565 |
| 2007/0275126 A1 | 11/2007 | Chan | |
| 2008/0020120 A1 | 1/2008 | O'Donnell Kiely | |
| 2008/0241334 A1 * | 10/2008 | Liberman | 426/565 |
| 2009/0178430 A1 | 7/2009 | Jendrusch et al. | |
| 2010/0183789 A1 * | 7/2010 | Zorovich et al. | 426/421 |
| 2013/0011530 A1 | 1/2013 | Wolf et al. | |
| 2013/0022725 A1 * | 1/2013 | Chan | 426/515 |
| 2013/0029019 A1 * | 1/2013 | Pryor et al. | 426/389 |
| 2014/0079860 A1 * | 3/2014 | Ho | 426/515 |

FOREIGN PATENT DOCUMENTS

| | | |
|---|---|---|
| EP | 0417413 | 5/1994 |
| EP | 1391173 | 2/2004 |
| EP | 2327313 | 6/2011 |
| GB | 0698414 | 10/1953 |
| JP | 57155953 A | 9/1982 |
| JP | 06343393 A | 12/1994 |
| JP | 2003116467 | 4/2003 |
| WO | 9922603 A1 | 5/1999 |
| WO | 2010083045 | 7/2010 |

OTHER PUBLICATIONS

PCT/US2014/011785 Written Opinion of the International Searching Authority, International Filing Date Jan. 16, 2014, (7 pages).
PCT/US2014/011785 Notification of Transmittal of the International Search Report and the Written Opinion of the International Searching Authority, or Declaration, International Filing Date Jan. 16, 2014, (5 pages).

* cited by examiner

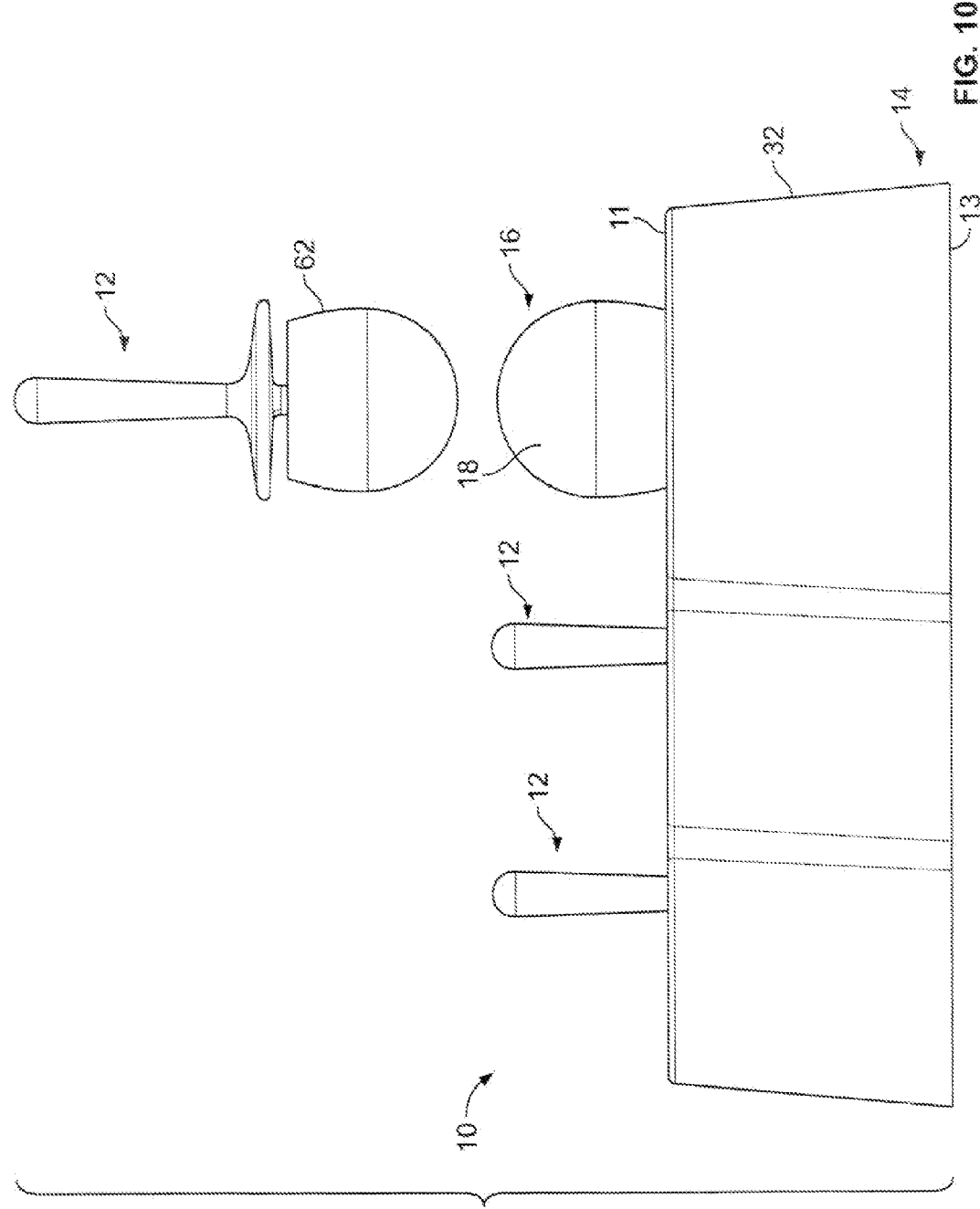

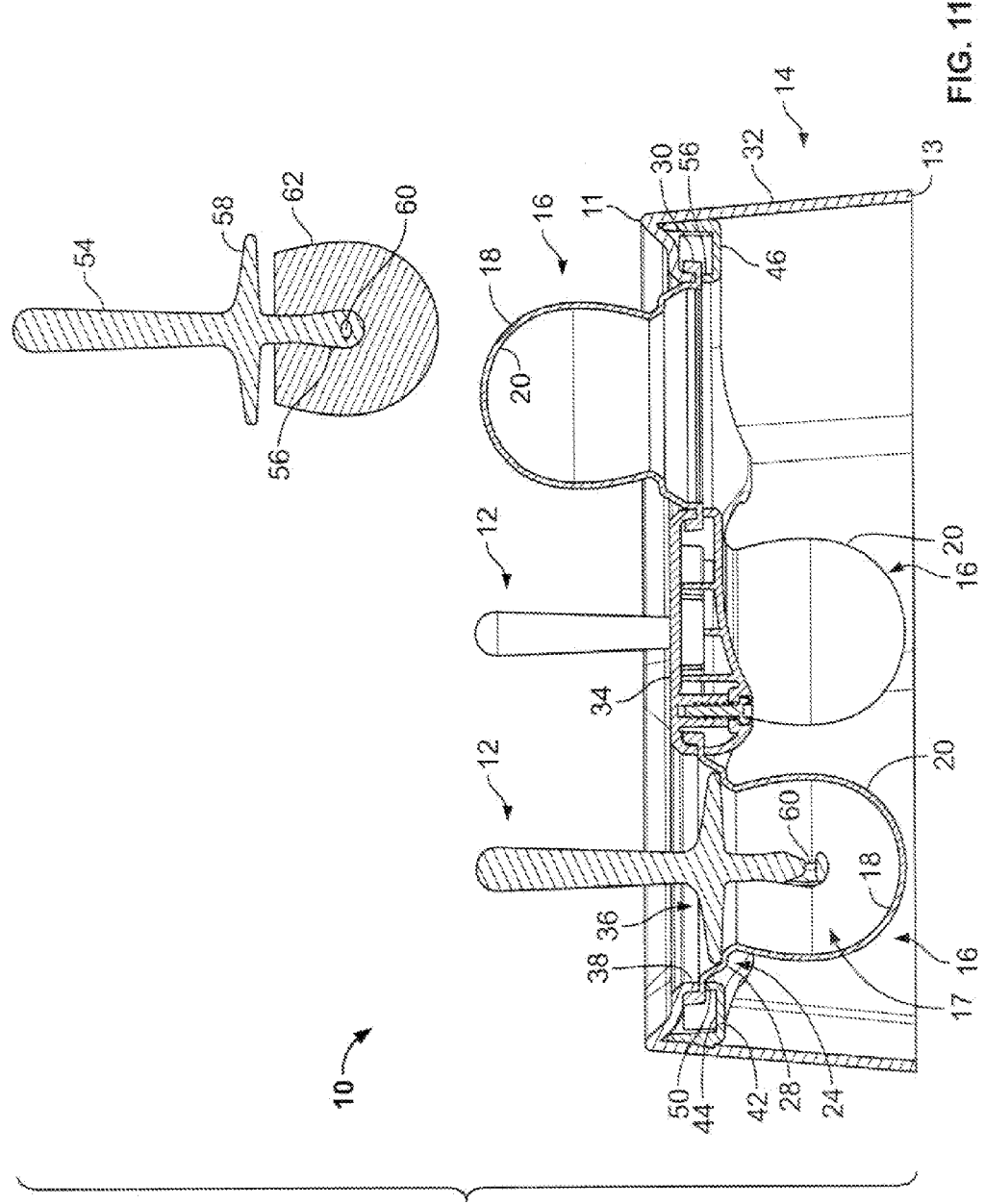

APPARATUS FOR MAKING FROZEN COMESTIBLES

CROSS REFERENCE TO RELATED APPLICATIONS

This application is a Section 111(a) application relating to and claiming the benefit of commonly owned, U.S. Provisional Patent Application Ser. No. 61/753,333 entitled "ICE POP MAKER," filed on Jan. 16, 2013, the entirety of which incorporated by reference herein.

FIELD OF THE INVENTION

The present invention relates to an apparatus for making frozen comestibles and, more particularly, to an apparatus for making frozen comestibles having molds that are reversible.

BACKGROUND OF THE INVENTION

Apparatus having molds that form frozen comestibles, such as ice pops, have been in use commercially and domestically for many years. Removing the ice pops from the molds and cleaning the molds after the ice pops are removed from the molding cavities have remained inconvenient processes. Thus, there is a need for an apparatus that utilizes ice pop molding cavities that reverse their shapes when the ice pops are removed.

SUMMARY OF THE INVENTION

In an embodiment, an apparatus for making frozen comestibles, comprising a base having a first side, a second side opposite the first side, interior portion intermediate the first and second sides, and at least one aperture formed within the first side; and at least one mold attached to the base, the at least one mold including a receiving surface and an opening aligned with the at least one aperture of the base, wherein the at least one mold is moveable between a first position, in which a substantial portion of the at least one mold is positioned within the interior portion of the base and the receiving surface forms a molding cavity that is adapted to receive a comestible to be frozen, and a second position in which a substantial portion of the at least one mold extends outwardly from the first side of the base and the receiving surface of the at least one mold is exposed externally at the first side of the base.

In an embodiment, the at least one mold is adapted to move from the first position to the second position when a frozen comestible is removed from the at least one mold. In an embodiment, the at least one mold includes a plurality of molds, and the at least one aperture of the base includes a plurality of apertures, each of the openings of the plurality of molds is aligned with a corresponding one of the plurality of apertures of the base.

In an embodiment, the apparatus includes a plate attached to the base for securing the plurality of molds to an underside of the first side of the base. In an embodiment, the base includes a plurality of lips, each of which extends from the underside of the first side of the base and surrounds a corresponding one of the plurality of apertures of the base, wherein each of the plurality of molds includes a collar having are upper surface, a lower surface opposite the upper surface, and a lip extending from the upper surface, and wherein the plate includes an upper surface a lower surface opposite the upper surface of the plate, and a plurality of standoffs each of which extends from the upper surface of the plate, the lip of the collar of each of the plurality of molds bears on the underside of the first site of the base, each of the plurality of lips of the base bears on the upper surface of the collar of a corresponding one of the plurality of molds, and each of the standoffs of the plate bears on the bottom surface of the collar of a corresponding one of the plurality of molds. In an embodiment, the underside of the base includes a plurality of bosses extending therefrom, and the plate includes a plurality of holes each of which extends from the upper surface of the plate to the lower surface of the plate, wherein each of the plurality of holes of the plate aligns with a corresponding one of the plurality of bosses of the base, each of the aligned plurality of holes of the plate and the plurality of bosses of the base adapted to receive a fastener for securing the plate to the base.

In an embodiment, each of the plurality of molds is made from a flexible material. In an embodiment, the flexible material includes silicone rubber. In an embodiment, each of the plurality of mold, includes a bulb shape. In an embodiment, each of the openings of the plurality of molds is circular in shape. In an embodiment, each of the openings of the plurality of molds includes a cross-sectional shape that is selected from the group consisting of elliptical, square, star, and diamond. In an embodiment, each of the plurality of molds includes a fill line.

In an embodiment, the apparatus includes a plurality of sticks each of which is adapted to engage the molding cavity of a corresponding one of the plurality of molds. In an embodiment, each of the plurality of sticks includes a positioning ring having a first side, a second side opposite the first side of the positioning ring, a stem extending from the first side of the positioning ring, and a handle extending from the second side of the positioning ring, the positioning ring of each of the plurality of sticks is adapted to be positioned on the collar of a corresponding one of the plurality of molds and the stem of each of the plurality of sticks is adapted to be inserted within the molding cavity of the corresponding one of the plurality of molds. In an embodiment, the stem of each of the sticks includes a through hole.

In an embodiment, an apparatus for making frozen comestibles, comprising a base having a first side, a second side opposite the first side, an interior portion intermediate the first and second sides, and at least one aperture formed within the first side; and at least one mold formed integrally with the base, the at least one mold including a receiving surface and an opening aligned with the at least one aperture of the base, wherein the at least one mold is moveable between a first position, in which a substantial portion of the at least one mold is positioned within the interior portion of the base and the receiving surface forms a molding cavity that is adapted to receive a comestible to be frozen, and a second position, in which a substantial portion of the at least one mold extends outwardly from the first side of the base and the receiving surface of the at least one mold is exposed externally at the first side of the base.

BRIEF DESCRIPTION OF THE DRAWINGS

For a more complete understanding of the present invention, reference is made to the following detailed description of an exemplary embodiment considered in conjunction with the accompanying drawings in which:

FIG. 10 is a side elevational view of the ice pop maker and sticks shown in FIG. 8; and FIG. 11 is a cross-sectional view of the ice pop maker and sticks shown in FIG. 8, the cross-section of the ice pop maker being taken along the line 11-11 and looking in the direction of the arrows.

DETAILED DESCRIPTION OF THE EXEMPLARY EMBODIMENT

Figure 1:
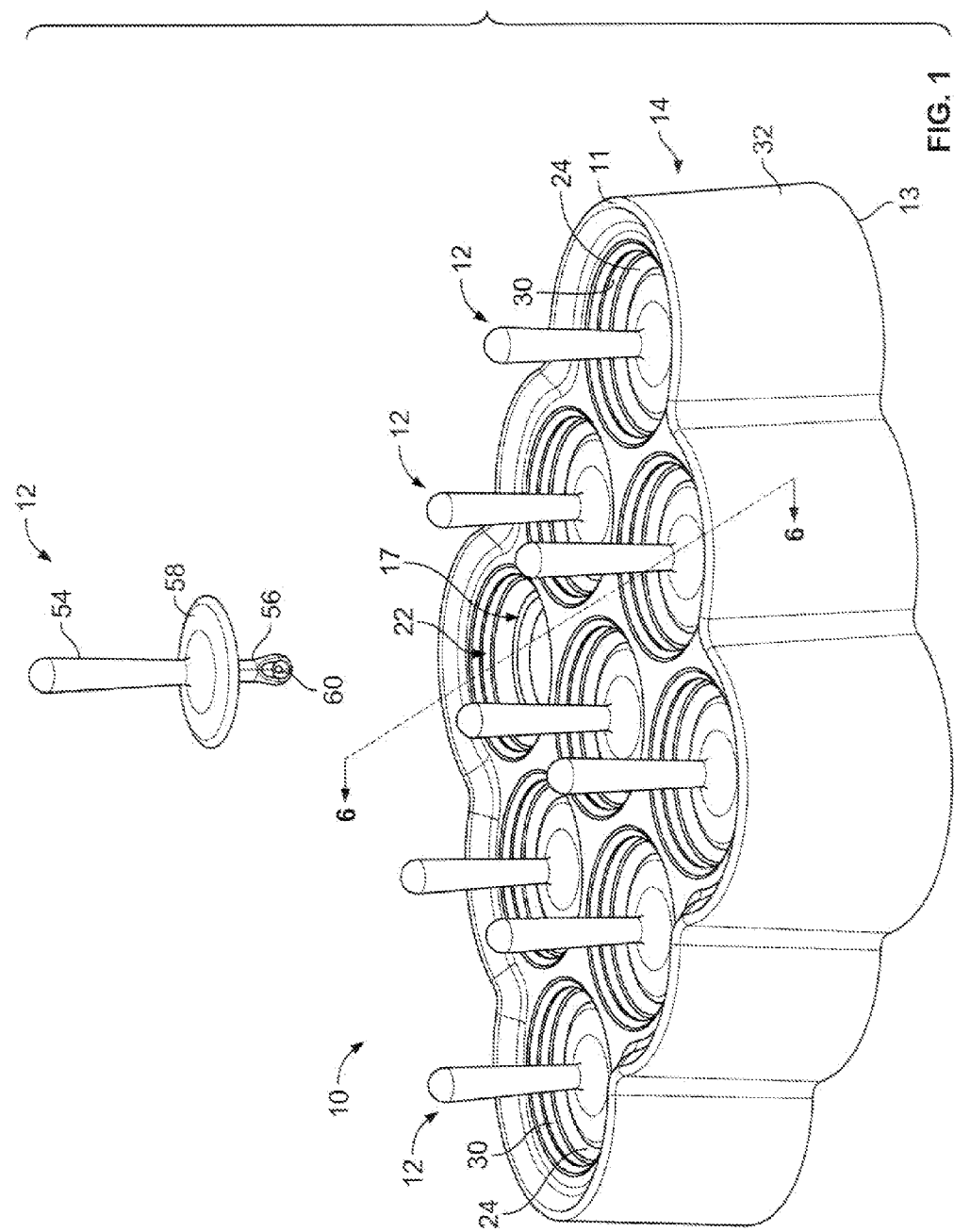
FIG. 1 is a top perspective view of an ice pop maker and associated ice pop sticks constructed in accordance with an embodiment of the present invention.
Figure 2:
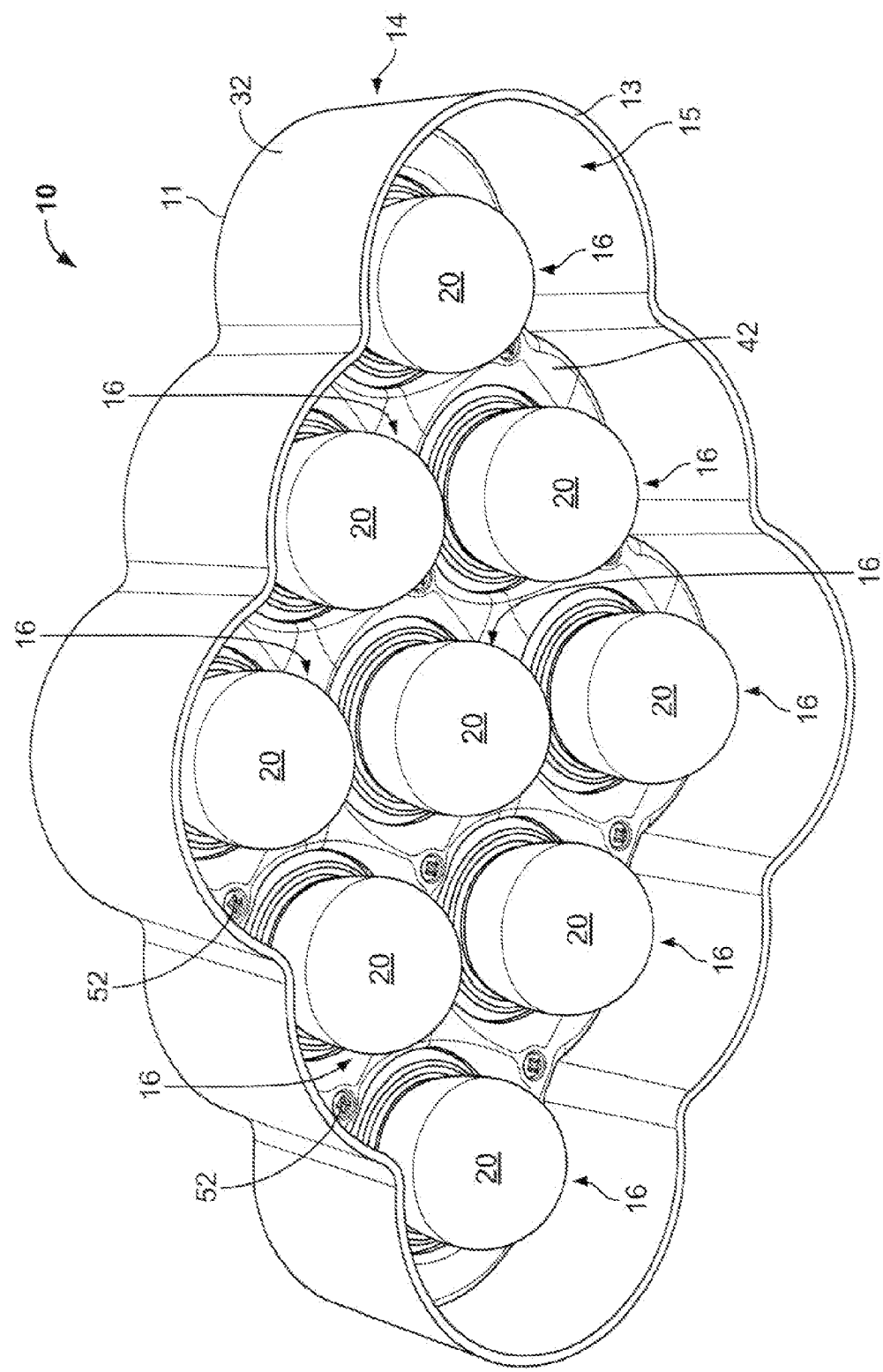
FIG. 2 is a bottom perspective view of the ice pop maker shown in FIG. 1.
Figure 3:
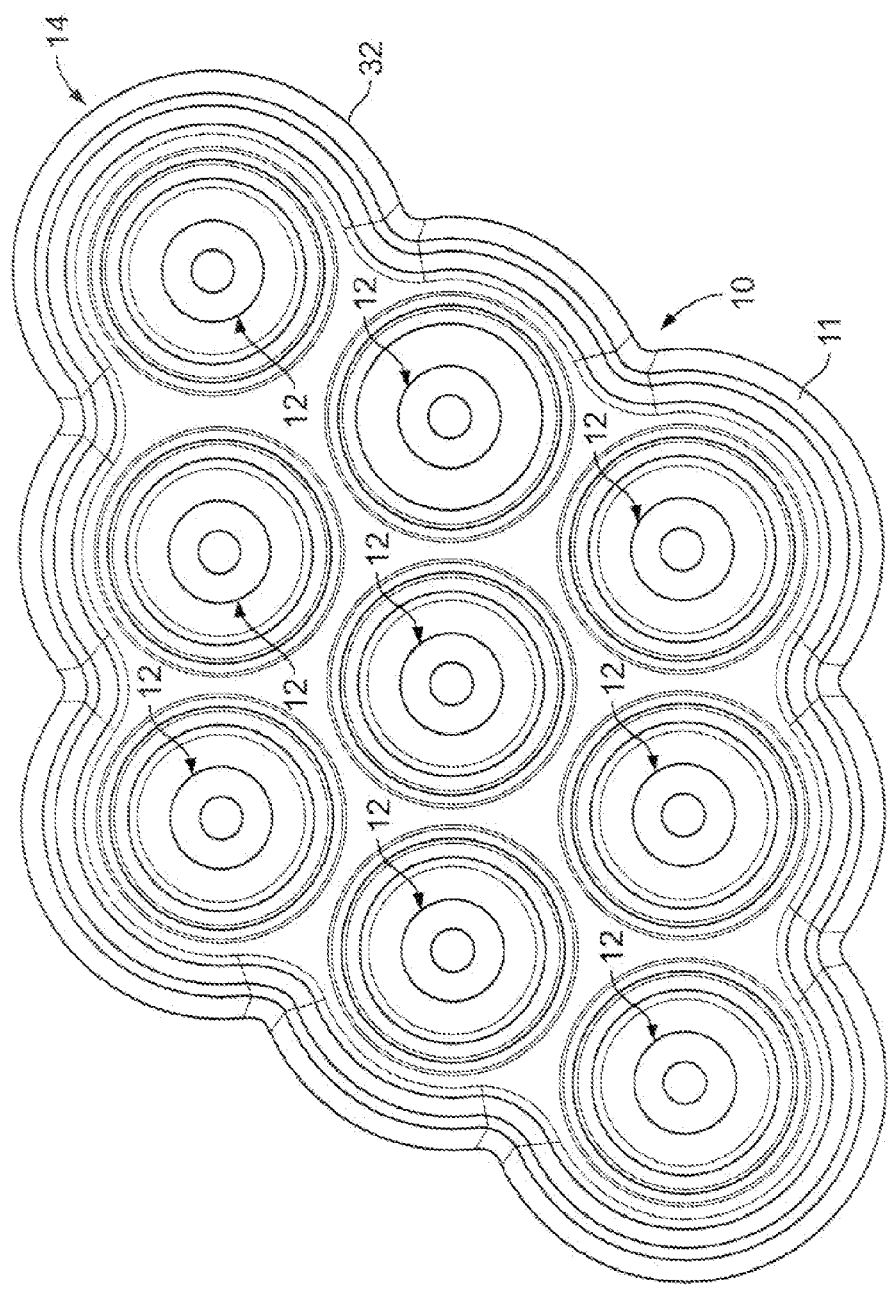
FIG. 3 is a top plan view of the ice pop maker shown in FIG. 1.
Figure 4:
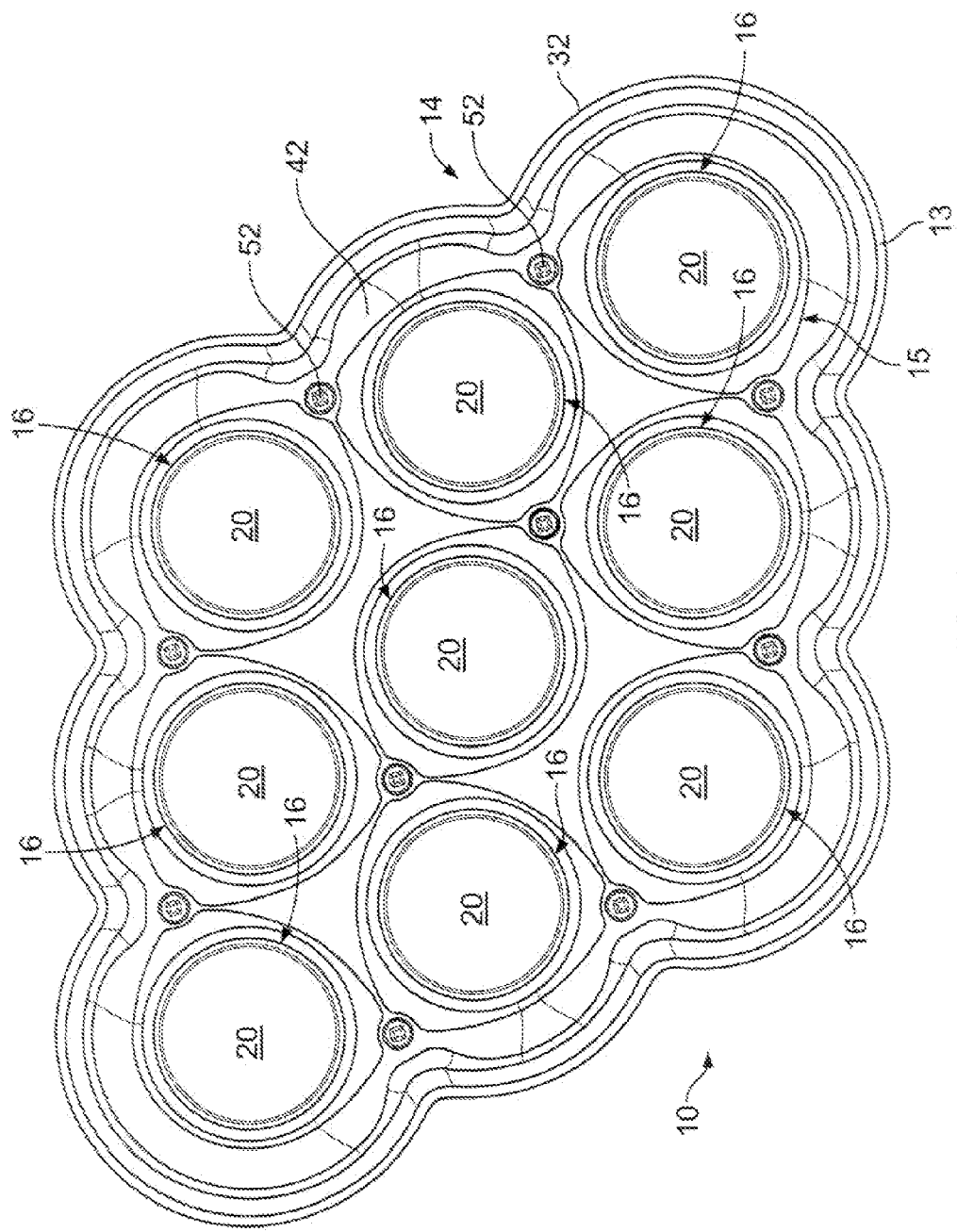
FIG. 4 is a bottom plan view of the is pop maker shown in FIG. 1.

FIGS. 1 through 6 illustrate an apparatus for making frozen comestibles 10 and a plurality of sticks 12 constructed in accordance with an embodiment. In an embodiment, the apparatus 10 includes a base 14 having a first side 11, a second slide 13 opposite the first side 11, and an interior portion 15 intermediate the first and second sides 11, 13. In an embodiment, the apparatus 10 includes a plurality of molds 16 attached to the base 14. In an embodiment, the molds 16 are attached to the first side 11 of the base 14 and extend within the interior portion 15 of the base 14 from the first side 11 towards the second side 13. In another embodiment, the molds 16 are formed integrally with the base 14. In an embodiment, each of the molds 16 includes molding cavity 17 formed therein. In an embodiment, each of the molds 16 is sized shaped, and adapted to receive a comestible (e.g. a liquid comestible or a moldable solid comestible) to be frozen. In another embodiment, the apparatus 10 includes at least one of the molds 16. In an embodiment, each of the molds 16 includes a receiving surface 18, a non-receiving surface 20 opposite the receiving surface 18, and a circular-shaped opening 22 that is surrounded circumferentially by a circular-shaped collar 24. In an embodiment, the collar 24 includes an upper surface 26, a lower surface 28 opposite the upper surface 26, and an upward-facing lip 30 extending from the upper surface 26. In an embodiment, each of the molds 16 includes a fill line (not shown in the Figures) positioned at or proximate to the upper surface 26 thereof to indicate a proper level of the comestible (e.g., fluids) to be placed within the molding cavity 17 of the mold 16. In certain embodiments, the fill line includes step, an indentation, or a printed fill line.

In other embodiments, each of the molds 16 may have other shapes and sizes (e.g., elliptical, square, star-shaped, diamond, etc. in cross-section). In an embodiment, each of the molds 16 is made of silicone rubber. In an embodiment, each of the molds 16 has a durometer of about 40 A. In an embodiment, each of the molds 16 has a durometer of about 50 A. In an embodiment, each of the molds 16 has a durometer of about 60 A. In other embodiments, each of the molds 16 may be made from other suitable materials known in the art and/or have other durometer values. In an embodiment, each of the molds 16 is formed individually and is separate and distinct from the other molds 16. In an embodiment, the molds 16 are interconnected with one another and integrally formed. In various embodiments, the molds 16 may be fabricated by compression molding, injection molding, or by other suitable methods. In an embodiment, the apparatus 10 includes nine (9) of the molds 16. In other embodiments, the apparatus 10 includes more or less than nine of the molds 16.

Still referring to FIGS. 1 through 6, in an embodiment, the base 14 includes a sidewall 32 that supports the first side 11 thereof. In an embodiment, the first side 11 includes a plurality of circular-shaped apertures 36. In an embodiment, each of the apertures 36 communicates with a corresponding one of the plurality of openings 22 of the molds 16. In an embodiment, the first side 11 includes nine (9) of the apertures 36. In an embodiment, the apertures 36 are surrounded circumferentially by downwardly facing lips 38 extending from an underside 34 of the first side 11. In an embodiment, the underside 34 further includes a plurality of bosses 40. In an embodiment, the base 14 may be fabricated from plastic by injection molding.

Figure 6:
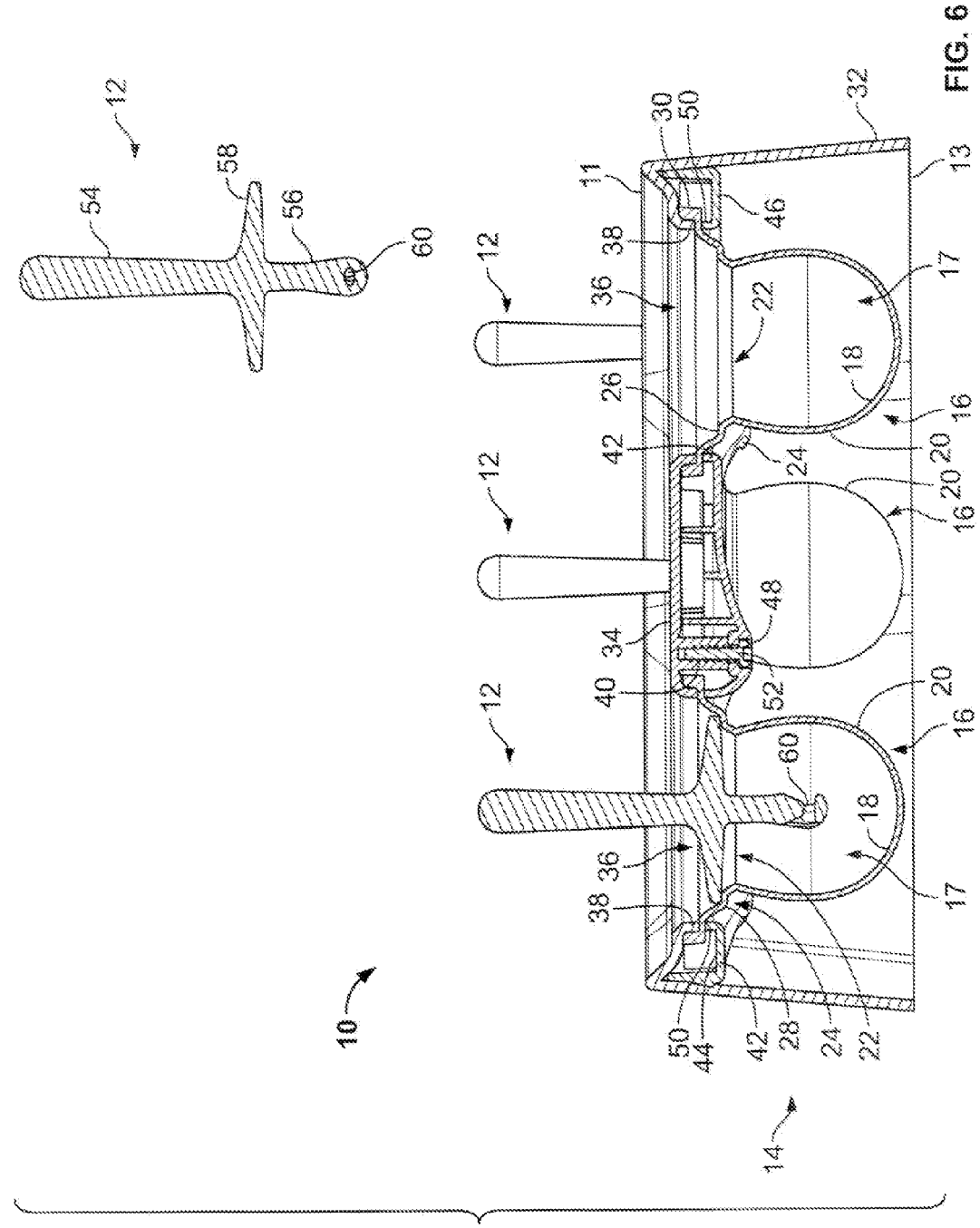
FIG. 6 is a cross-sectional view of the ice pop maker and sticks shown in FIG. 1, taken along the line 6-6 and looking in the direction of the arrows.
Figure 7:
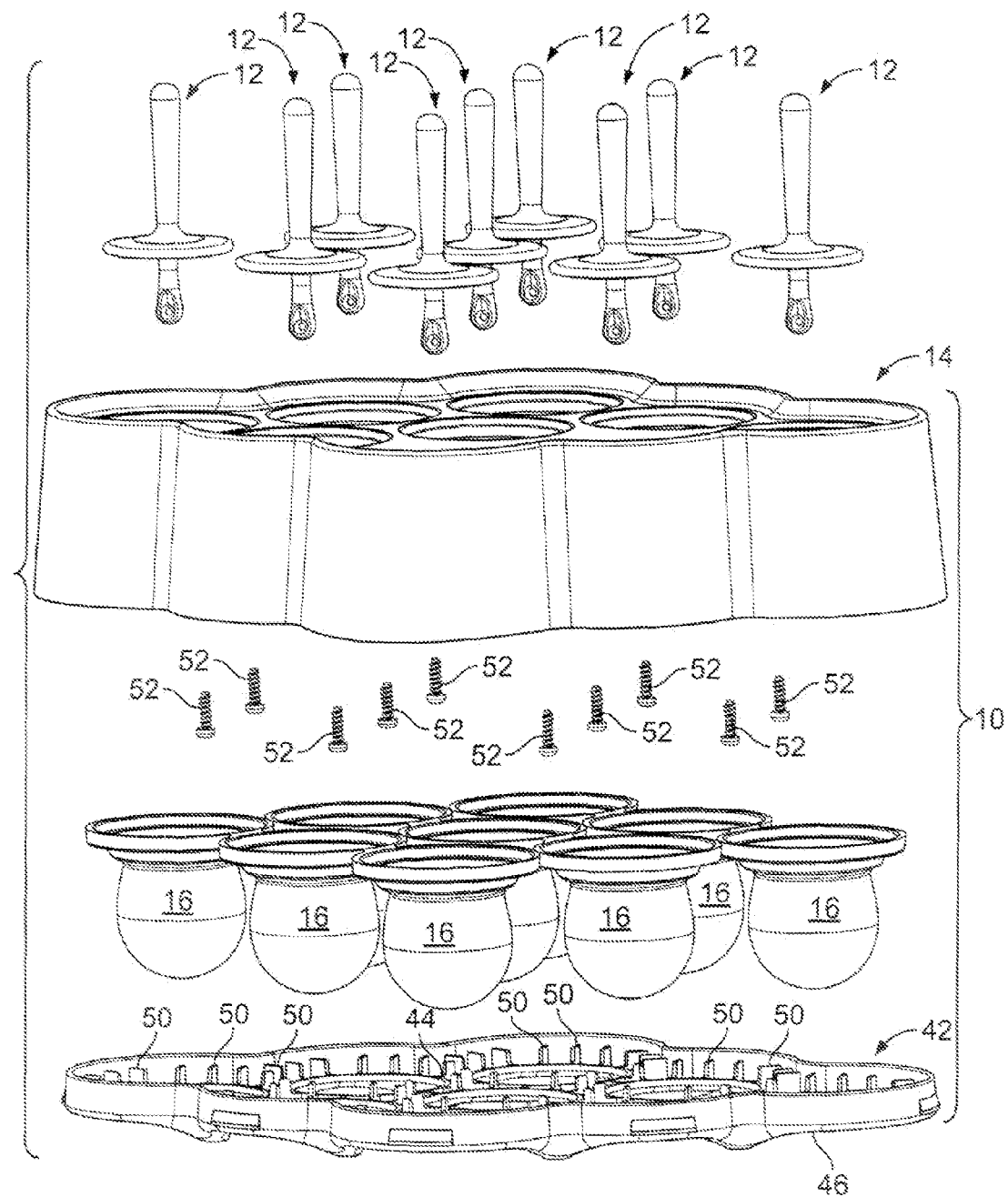
FIG. 7 is an exploded view of the ice pop maker and sticks shown in FIG. 1.

As shown in FIGS. 6 and 7, the molds 16 are secured to the underside 34 of the first side 11 of the base 14 by a plate 42. In an embodiment, the plate 42 includes an upper surface 44 and a lower surface 46 opposite the upper surface 44, a plurality of holes 48, each of which extends from the upper surface 44 to the lower surface 46, and a plurality of standoffs 50 extending from the upper surface 44 of the plate 42. In an embodiment, the plate 42 may be made of plastic or other suitable materials, such as stainless steel.

Referring specifically to FIGS. 6 and 7, the plate 42 is secured to the base 14 by a plurality of screws 52 that are positioned through the holes 48 in the plate 42. In other embodiments, the plate 42 can be secured to the base 14 by other fastening means known in the art, such as rivets, adhesives, ultrasonic welding, etc. In an embodiment, the screws 52 self-tap into the bosses 40 of the base 14. In another embodiment, the bosses 40 may include female threads. In an embodiment the molds 16 are secured in the base 14 by the upward-facing lips 30 of the molds 16 bearing on the underside 34 of the first side 11, the downward facing lip 38 of the first side 11 bearing on the upper surface 26 of the collar 24 of the molds 16, and the standoffs 50 at the plate 42 bearing on the bottom surface 28 of the collar 24.

Figure 5:
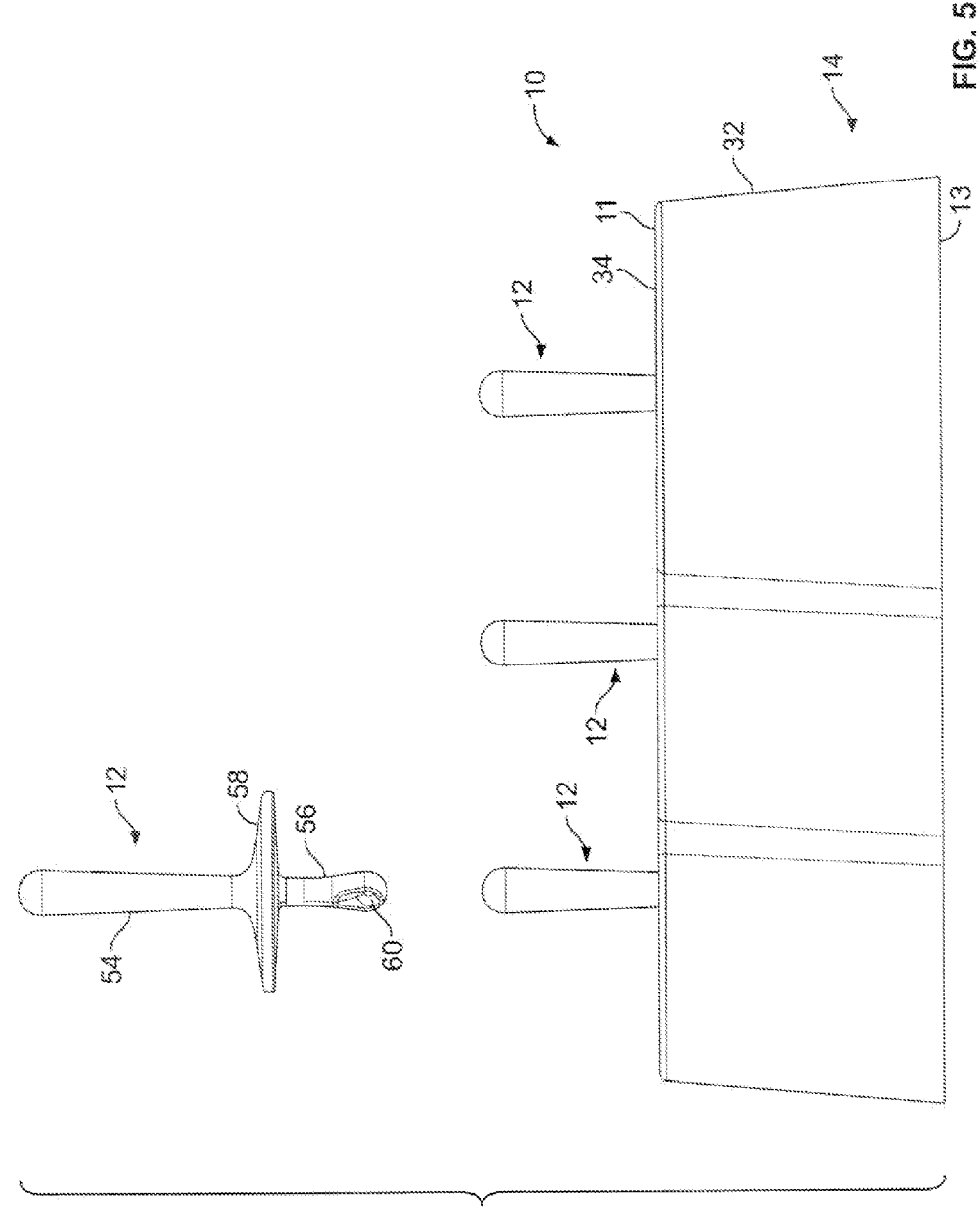
FIG. 5 is a side elevational view of the ice pop maker and sticks shown in FIG. 1.
Figure 8:
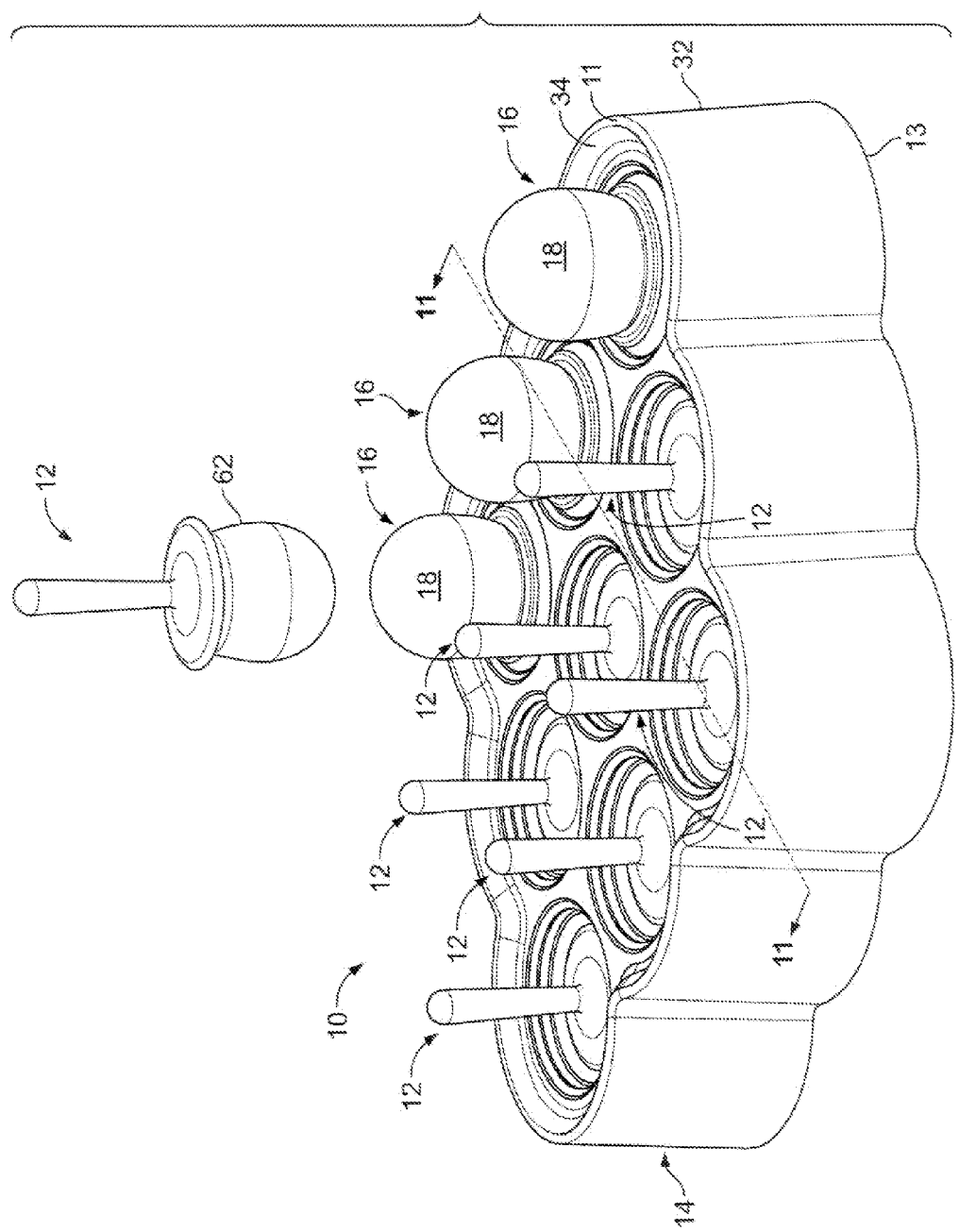
FIG. 8 is a top perspective view of the ice pop maker and sticks, the ice pop maker being shown with three molding cavities having their shapes reversed, and a detached stick is shown with a frozen comestible formed thereon.
Figure 9:
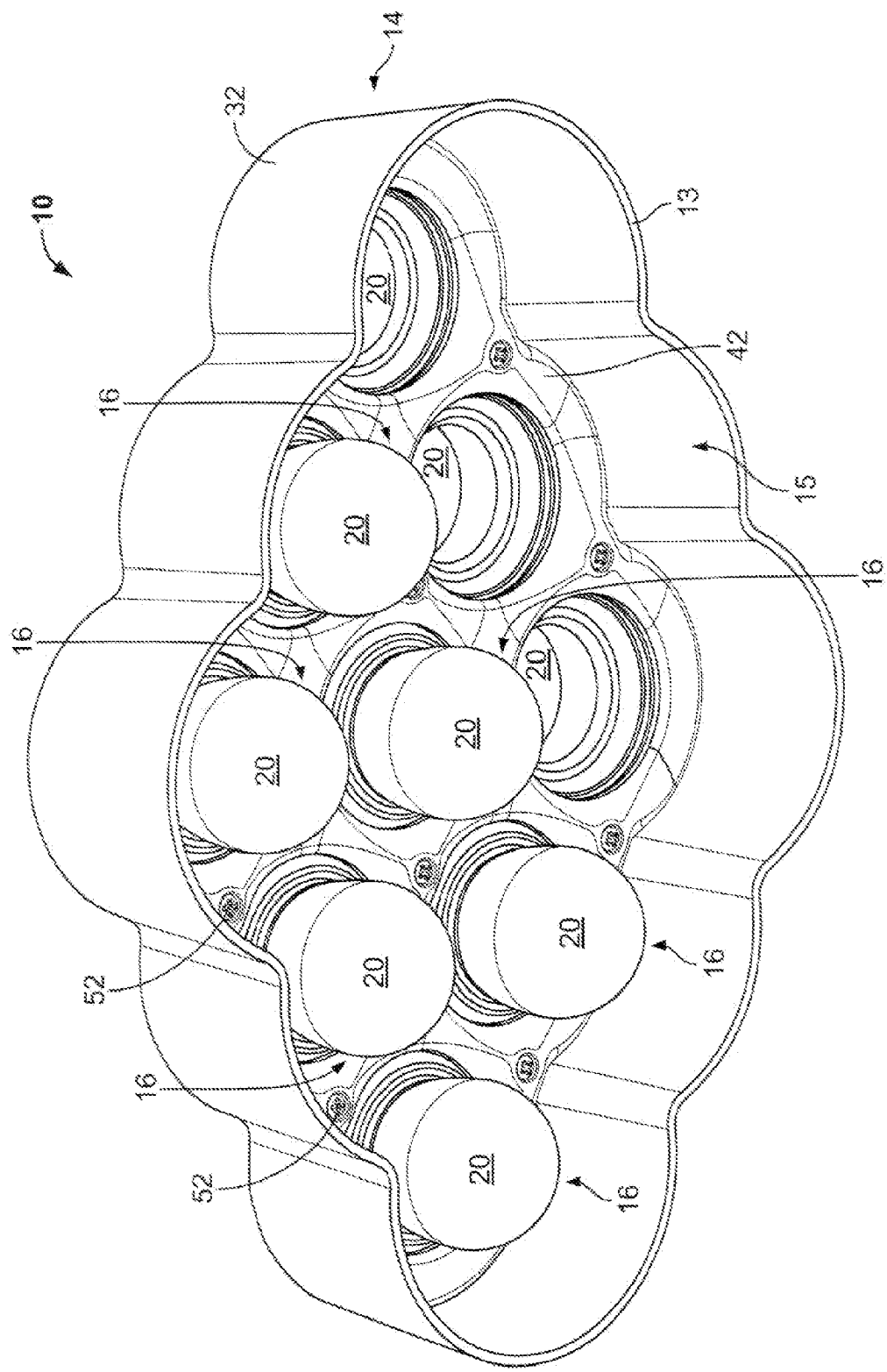
FIG. 9 is a bottom perspective view of the pop maker shown in FIG. 8.

Referring to FIGS. 1, 5 and 6, in an embodiment, each of the sticks 12 includes a handle 54 and a stem 56. In an embodiment, the handle 54 facilitates the handling of the stick 16. In an embodiment, the stem 56 provides a surface on which a frozen comestible 62 may be formed. In an embodiment, a positioning 58 is positioned between the handle 54 and the stem 56. In an embodiment, the stem 56 includes a through-hole 60 positioned at a free end thereof and distal from the positioning ring 58. In an embodiment, the through hole 60 is provided to maximize the gripping strength of the frozen comestible 62 on the stem 56 by providing more surface area for the frozen comestible 62 and allowing a reinforcing, transverse inner core (not shown) to form, which braces against bottom portion of the through hole 60 (for examples of the frozen comestibles 62, such as ice pops, see FIGS. 8, 10 and 11). In an embodiment, each of the sticks 12 be integrally formed out of plastic or other suitable materials.

With reference to FIGS. 8 through 11, any one or all of the molds 16 may be filled with a comestible to be frozen, such as, for example, liquid beverage (e.g. juices, flavored waters, energy drinks sodas, milks, etc.) or a moldable solid comestible (e.g., puddings, melted chocolate, etc.). In an embodiment, each of the molding cavities 17 of the molds 16 may be filled with a comestible to its respective fill line (not shown), and one of the sticks 12 is inserted into a corresponding one of the filled molding cavities 17. For each of the sticks 12, the positioning ring 58 thereof is placed and preferably centered on the collar 24 of the corresponding mold 16 so that the stem 56 of the stick 12 extends into the molding cavity 17 filled with the comestible. When the desired number of molds 16 is filled, the apparatus 10 is placed in a freezer for a time sufficient to freeze the comestibles. When the comestibles are frozen, each of the frozen comestibles 62 is formed and adheres to the corresponding stick 12 in particular, the stem 56. As the stick 12 is pulled out of the corresponding mold 16 the frozen comestible 62 passes through the opening 22 of the mold 16 (see FIG. 6). In an embodiment, the mold 16 generates a frozen comestible 62 that is larger than the opening of the collar 24, and the collar 24 is deformed elastically as the frozen comestible 62 passes through the opening 22, and an air-lock seal is established between the frozen comestible 62 and the receiving surface 18 of the mold 16. As the frozen comestible 62 continues to pass through the opening 22 of the mold 16, a vacuum is formed whereby the air-lock vacuum pulls (i.e., sucks) receiving surface 18 of the mold 16 through the collar 24, thereby reversing and inverting the shape of the mold 16 from a first, receiving position to a second, inverted position. As the frozen comestible 62 is pulled further and the mod 16 is reversed (i.e., inverted), the frozen comestible 62 begins to peel off of the receiving surface 18 of the mold 16 until the frozen comestible 62 detaches from the mold 16. The foregoing enables the frozen comestibles 62 to be pulled out of the molds 16 an easy and convenient manner. For example, the molds 16 do not have to be subjected to running water to loosen the frozen comestibles 62 therefrom. Also, by inverting the molds 16, one can create frozen comestibles 62 with shapes that are not possible with rigid molds (e.g., elliptical, square, star-shaped, diamond, etc.). Once the molds 16 are reversed, the receiving surfaces 18 of the molds 16 are fully exposed and may be conveniently cleaned. Once cleaned, each mold 16 is then manually pushed back (i.e., reverted) through its associated opening 22 so that the shapes of the molds 16 are restored to their receiving shapes (i.e., for receiving the comestibles) corresponding to their first, receiving position. In an embodiment, the molds 16 may be manually moved between their first positions and their second positions.

It should be appreciated that the present invention provides numerous advantages which include, for example, the automatic conversion of the shape of the mold 16 from the receiving shape to the reversed shape (i.e., from the first position to the second position) by the removal of the frozen comestible 62 from the mold 16. Additionally, the reversed shape of the mold 16 provides a convenient cleaning configuration of the receiving surface 18 so as to lessen the time and effort required to clean the molds 16.

It Will be understood that the embodiment described herein is merely exemplary and that a person skilled in the art may make many variations and modifications without departing from the spirit and scope of the invention. For instance, all such variations and modifications, in addition to those described above, are intended to be included within the scope of the claims.

What is claimed is:

1. An apparatus, comprising:
   a base having a first side with an underside, a second side opposite said first side, an interior portion intermediate said first and second sides, a plurality of apertures, each of which is formed within said first side, a plurality of lips, each of which extends from said underside and surrounds a corresponding one of said plurality of apertures, and a plurality of bosses extending from said underside;
   a plurality of molds attached to said base, each of said plurality of molds including a receiving surface, an opening aligned with a corresponding one of said plurality of apertures of said base, and a collar having an upper surface, a lower surface opposite said upper surface, and a lip extending from said upper surface; and
   a plate attached to said base for securing said plurality of molds to said underside of said first side of said base, said plate including an upper surface, a lower surface opposite said upper surface of said plate, a plurality of standoffs, each of which extends from said upper surface of said plate, and a plurality of holes, each of which extends from said upper surface of said plate to said lower surface of said plate, wherein each of said plurality of holes of said plate aligns with a corresponding one of said plurality of bosses of said base, each of said aligned plurality of holes of said plate and said plurality of bosses of said base is adapted to receive a fastener for securing said plate to said base,
   wherein said lip of said collar of each of said plurality of molds bears on said underside of said first side of said base, each of said plurality of lips of said base bears on said upper surface of said collar of a corresponding one of said plurality of molds, and each of said plurality of standoffs of said plate bears on said lower surface of said collar of a corresponding one of said plurality of molds,
   wherein each of said plurality of molds is moveable between a first position, in which a substantial portion of said mold is positioned within said interior portion of said base and said receiving surface of said mold forms a molding cavity that is adapted to receive a comestible to be frozen, and a second position, in which a substantial portion of said mold extends outwardly from said first side of said base and said receiving surface of said mold is exposed externally at said first side of said base when, after the comestible is frozen, the comestible is removed from said mold.

2. The apparatus of claim 1, wherein each of said plurality of molds is made from a flexible material.

3. The apparatus of claim 2, wherein said flexible material includes silicone rubber.

4. The apparatus of claim 1, wherein each of said plurality of molds includes a bulb shape.

5. The apparatus of claim 4, wherein each of said openings of said plurality of molds is circular in shape.

6. The apparatus of claim 1, wherein each of said openings of said plurality of molds includes a cross-sectional shape that is selected from the group consisting of elliptical, square, star, and diamond.

7. The apparatus of claim 1, wherein each of said plurality of molds includes a fill line.

8. The apparatus of claim 1, further comprising a plurality of sticks each of which is adapted to engage said molding cavity of a corresponding one of said plurality of molds.

9. The apparatus of claim 8, wherein each of said plurality of sticks includes a positioning ring having a first side, a second side opposite said first side of said positioning ring, a stem extending from said first side of said positioning ring, and a handle extending from said second side of said positioning ring, said positioning ring of each of said plurality of sticks is adapted to be positioned on said collar of a corresponding one of said plurality of molds and said stem of each of said plurality of sticks is adapted to be inserted within said molding cavity of said corresponding one of said plurality of molds.

10. The apparatus of claim 9, wherein said stem of each of said sticks includes a through hole.

* * * * *